United States Patent [19]
Archibald et al.

[11] Patent Number: 5,301,246
[45] Date of Patent: Apr. 5, 1994

[54] DATA COMMUNICATIONS EQUIPMENT SECURITY DEVICE USING CALLING PARTY DIRECTORY NUMBER

[75] Inventors: James L. Archibald, Clearwater, Fla.; Steven D. Hunt, Freehold, N.J.; Richard K. Smith, Seminole, Fla.

[73] Assignee: AT&T Bell Laboratories, Murray Hill, N.J.

[21] Appl. No.: 921,164

[22] Filed: Jul. 29, 1992

[51] Int. Cl.[5] ............... H04L 9/32; H04L 12/22; G06F 13/14; H04B 1/38

[52] U.S. Cl. .................. 380/23; 380/4; 380/25; 380/49; 380/50; 340/825.31; 340/825.34; 375/8; 379/93; 379/95

[58] Field of Search ............ 380/4, 23, 24, 25, 49, 380/50; 379/93, 95, 90, 106; 340/825.31, 825.34; 375/8

[56] References Cited

U.S. PATENT DOCUMENTS

| | | | |
|---|---|---|---|
| 4,520,233 | 5/1985 | Smith | 379/95 |
| 4,876,717 | 10/1989 | Barron et al. | 380/25 |
| 4,930,150 | 5/1990 | Katz | 379/93 |
| 4,942,598 | 7/1990 | Davis | 379/57 |
| 5,003,595 | 3/1991 | Collins et al. | 380/25 |

OTHER PUBLICATIONS

"Voiceband Data Transmission Interface Generic Requirements"; (Bellcore, Technical Advisory TA-NW-T-000030, Issue 3; Apr., 1992).

"Class SM Feature: Calling Number Delivery"; (FSD01-02-1051; Bellcore, Tech. Ref. TR-TSY-00031, Issue 3; Jan., 1990).

Primary Examiner—Bernarr E. Gregory
Attorney, Agent, or Firm—Henry T. Brendzel

[57] ABSTRACT

A secure method of accessing a computer facility is provided within the data communications equipment (DCE), e.g., a modem or a terminal server, by the use of Calling Party Directory Number (CPDN). In particular, a telephone line from the local public switched telephone network is configured to provide CPDN information. This telephone line terminates in the DCE, which stores a plurality of lists, each list comprising a plurality of CPDN numbers. Upon receiving a telephone call from a calling party, the DCE takes one of three courses of action depending on the calling party's CPDN: 1) the DCE can answer the telephone call if the calling party's CPDN is on the "caller pays" list; 2) the DCE can refuse to answer the telephone call and then return the telephone call if the CPDN is on the "we pay" list; or 3) the DCE can simply not answer, or return, the telephone call if the calling party's CPDN is not found on any of the plurality of lists.

16 Claims, 5 Drawing Sheets

DATA COMMUNICATIONS EQUIPMENT SECURITY DEVICE USING CALLING PARTY DIRECTORY NUMBER

BACKGROUND OF THE INVENTION

The present invention relates to data communications equipment (DCE) and to computer systems. In particular, this invention relates to the use of data communications equipment to provide secure access to a computer system.

The use of computers in today's world is continually on the increase, from main-frames to personal computers, more and more people are using computer systems. In fact, it is the accessibility of a computer itself, via a modem and the public switched telephone network (PSTN), that allows almost anyone to benefit from the use of a computer. Unfortunately, this accessibility also seems to attract "intruders," i.e., illegitimate users of a computer system. As a result, the security of a computer system, or even a network of computers, as to both the integrity and distribution of the information stored on a computer, is an item of continuing concern to the legitimate users, owners, and operators of computers. In response to this need of providing some type of access security to a computer system a number of alternatives have been proposed.

U.S. Pat. No. 5,003,595, issued to Collins et al. on Mar. 26, 1991, uses the automatic number identification (ANI) of the calling party to determine if the calling party is allowed to access a computer system. In particular, a private branch exchange (PBX) detects and separates, from a calling party's telephone call, the calling party's ANI. The PBX sends the calling party's ANI to an adjunct processor, which is a computer that is designed to work in conjunction with the PBX, for analysis. The adjunct processor compares the calling party's ANI to a list of numbers that includes the automatic number identifications of all authorized users of the respective computer system that the calling party is trying to access. If the calling party's ANI is on the list of numbers for the respective computer system, then the call is completed. However, if the calling party's ANI is not on the list of numbers, the call is not answered.

U.S. Pat. No. 4,876,717, issued to Barron et al. on Oct. 24, 1989, also uses an adjunct processor in association with a PBX for providing secure access to a computer system. In this system, an incoming telephone call is answered and the calling party is prompted, via a voice recording, to enter identifying information, which can either be a voiceprint or a touch-tone signal. If there is a match between the identifying information, entered by the calling party, and respective identification information in the adjunct processor, the telephone call is terminated and the adjunct processor calls back the original calling party to establish a data call between the original calling party and the desired computer system. However, if the adjunct processor can not match the stored identification information with the calling party's identifying information, the telephone call is just terminated with no further action being taken by the adjunct processor.

U.S. Pat. No. 4,520,233, issued to Smith on May 28, 1985 uses a separate box called a "secure access unit," which is connected between the called party's modem, e.g., the computer's modem, and the central office. In particular, the secure access unit answers any incoming telephone call and waits for the additional entry of touch-tone information representing a 5 digit security code. If this security code is not detected within a particular time-frame, e.g., 23 seconds, the incoming telephone call is disconnected. However, if the secure access unit detects the correct security code, then the called party's modem is connected to the calling party's telephone call to allow access to the respective computer system.

The above-mentioned prior art, while providing secure arrangements to access computers, are not the complete answers to the problem. For example, the Collins et al. and Baton et al. patents both require the use of an adjunct processor, in conjunction with a PBX, a solution that appeals more to a medium, or a large, size business customer. On the other hand, the Smith patent, albeit providing a service more in tune to the small business and residential markets, requires that the incoming telephone call be answered in order to enter the appropriate security code and that the called party purchase an additional piece of equipment.

SUMMARY OF THE INVENTION

In establishing a data connection between a user (the calling party) and a computer (the called party), through the PSTN, there are, generally speaking, three types of components: data terminal equipment, data communications equipment, and a data circuit. Using these components, a typical data connection comprises the following: the user's data terminal equipment, the user's data communications equipment, a data circuit, the computer's data communications equipment, and the computer, which is considered to be data terminal equipment. In particular, the PSTN represents the data circuit. Either party's data communications equipment interfaces their data terminal equipment to the PSTN by providing the functions required to establish a data connection and also providing for the signal conversion and coding between the data terminal equipment and, in this case, the PSTN.

In accordance with the principles of the invention, we have realized a simple, and effective, technique for providing a security arrangement for accessing computer facilities. In particular, we have realized that the one component typically common in the above-mentioned prior art is the equipment that mediates between the terminal equipment and the transmission medium, i.e., the data communications equipment itself Therefore, secure access can be provided to a computer system by providing the following processing arrangement within the data communications equipment: 1) detecting the calling party's telephone number, and 2) then providing a level of security and service dependent on the calling party's telephone number. This allows the data communications equipment to determine which calling parties can access the computer. This method, for medium to large size businesses, frees up resources in any attached adjunct processors. In addition, for small businesses and the residential marketplace, no additional hardware is required other than the data communications equipment itself. As a result, this provides a simple and effective technique to protect a computer system from intruders.

In one embodiment of the invention, the data communications equipment is a modem. The incoming telephone line to the modem is configured to provide calling party directory number (CPDN) information. The modem includes a central processing unit (CPU), a memory, and a digital signal processor (DSP). The memory stores various lists and each list includes a plurality of CPDN numbers. When the modem answers an incoming telephone call, the CPU compares the calling party's CPDN to the various lists for providing different forms of security. One form of security is provided by comparing the calling party's CPDN to a list entitled "caller pays." This is a "Simple Password Security" scheme, where each CPDN on the caller pays list represents a calling party who is allowed access to the computer, which is attached to the modem, and who will bear the cost of the telephone call. If the calling party's CPDN is found on the caller pays fist, then the telephone call is allowed to proceed, and initialization and handshaking procedures are followed by the modem. Another form of security is provided by comparing the calling party's CPDN to a list corresponding to "we pay," i.e., the called party pays for the telephone call. This is a "Callback Security" scheme. If the calling party's CPDN is present on the "we pay" list, then the modem does not answer the telephone call but waits for the telephone call to disconnect. At this point, the modem then initiates a telephone call back to the original calling party. On the other hand, if the calling party's CPDN is not on either list, the modem simply does not answer the telephone call.

In another embodiment of the invention, the data communications equipment is a terminal server, which interfaces to a local area network (LAN), e.g., an ethernet. The terminal server includes a central processing unit (CPU), memory, and a digital signal processor (DSP). The memory stores various lists, each list including a plurality of CPDN numbers. Similar to the description above, there is a caller pays list and a we pay list. If the calling party's CPDN is found on either list, in addition to establishing the connection to the calling party, either by answering the telephone call or calling back the caging party, the calling party's CPDN is used to access a third list, which is a "network access" list. This network access list allows the terminal server to logically associate to the calling party's CPDN a level of security for accessing the LAN. Finally, as described above, if the calling party's CPDN is not on either the caller pays list or the we pay list, the terminal server simply does not answer the telephone call.

A feature of this invention is that the local, or called, data communications equipment has complete control over the telephone call. In the Simple Password Security scheme the local data communications equipment answers a calling, or remote, modem and the calling party pays any telephone toll charges. In the Callback Security mode the local data communications equipment returns the call of the calling party and the local data communications equipment pays for the telephone call. In addition, the type of security provided by the local data communications equipment is not dependent on the functionality, hardware or software, of the remote, or calling, data communications equipment. In other words, the remote data communications equipment does not have to provide a similar feature since the type of security only depends on the telephone number of the calling party.

DETAILED DESCRIPTION

This invention applies to a data communications equipment device and requires that the local public switched telephone line (PSTN) be equipped with the CPDN feature. An example of this type of central office feature can be found in Bellcore Technical Reference CLASS$^{SM}$ Feature: "Calling Number Delivery," TR-TSY-00003 1, Issue 3, Jan. 1990. The CPDN is a caller identification number and is typically the telephone number of the calling party. The idea is for the data communications equipment to decode the calling party's telephone number, via the calling party's CPDN, and then compare the calling party's CPDN to a plurality of lists, each list including a plurality of CPDN numbers. The incoming telephone call of a calling party is effectively screened by either a) matching the calling party's CPDN to a particular list, or b) if no match is found, simply ignoring the incoming telephone call. As a result, the use of CPDN allows the local data communications equipment to control the method and type of data connection to the calling party's data communications equipment.

Figure 1:
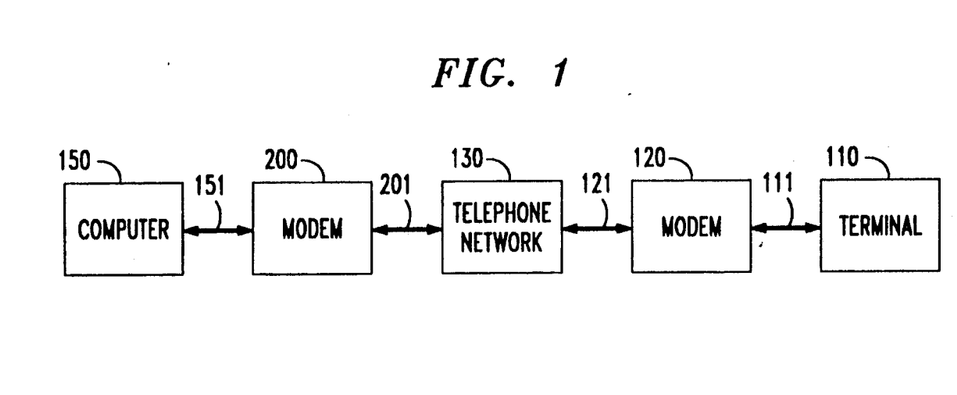
FIG. 1 is a block diagram of a point-to-point data communications system.
Figure 2:
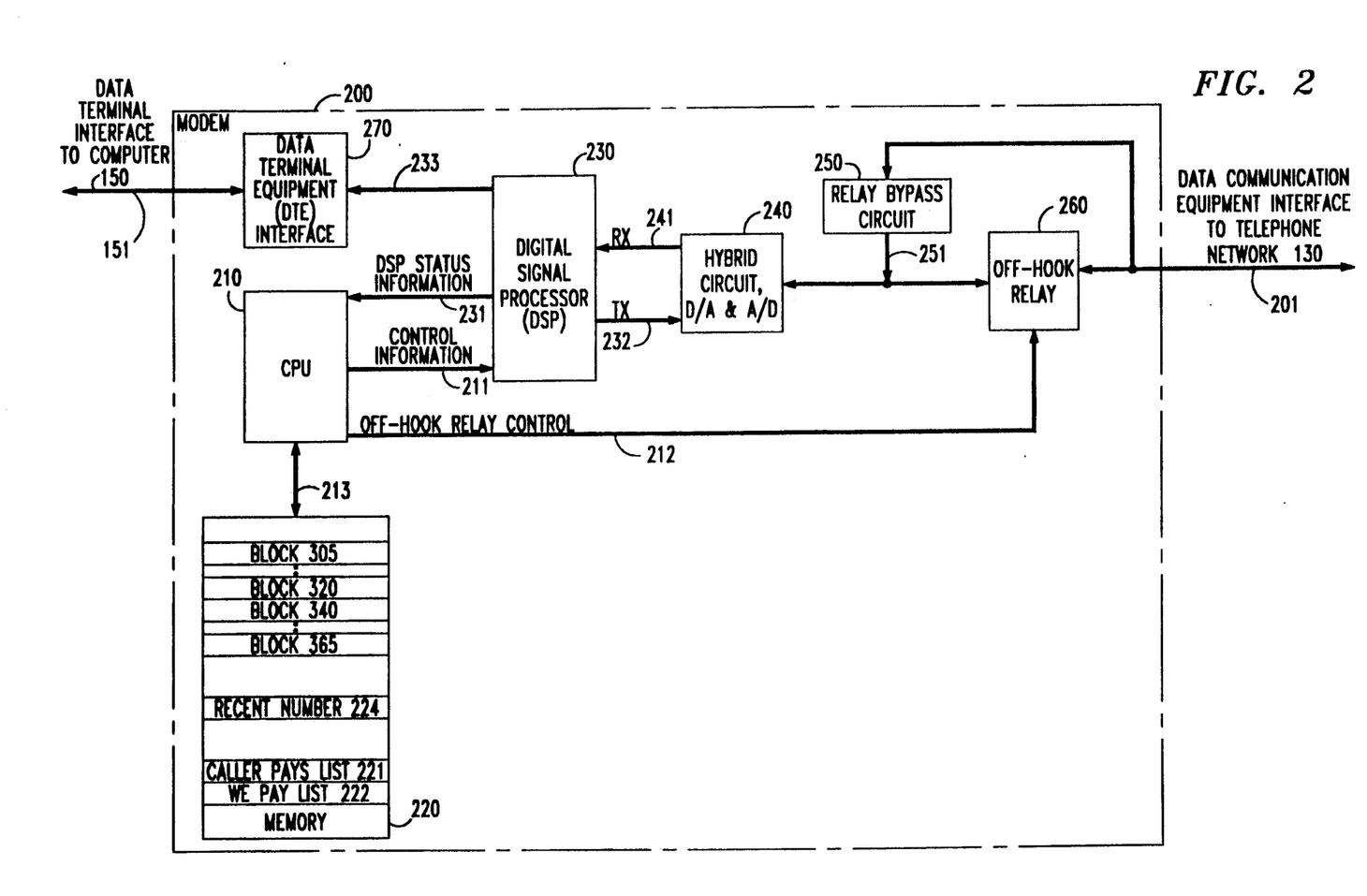
FIG. 2 is a block diagram of a modem embodying the principles of the invention that is used in the data communications system of FIG. 1.

A point-to-point data communications system is shown in FIG. 1. In the following example, it is assumed a calling party at terminal 110 initiates a telephone call in order to access computer 150 through remote modem 120, telephone network 130, and local modem 200. Lines 201 and 121 are representative of typical "tip/ring," or local loop, access provided by telephone network 130. Modem 200, of FIG. 1, embodies the principles of the invention and is shown in more detail in FIG. 2. Modem 200 comprises memory 220, CPU 210, Digital Signal Processor (DSP) 230, hybrid circuit 240, relay bypass circuit 250, off-hook relay 260, and data terminal equipment interface 270. CPU 210 is a microprocessor central processing unit, which operates on, or executes, program data stored in memory 220, via path 213. Memory 220 is representative of random access memory (RAM), and comprises a number of representative storage locations, of which a subset is shown in FIG. 2. It is assumed that memory 220 includes the plurality of CPDN lists, represented in FIG. 2 by "caller pays" list 221 and "we pay" list 222. In addition, for simplicity, it is assumed that hybrid 240 is not only a 2-to-4 wire converter but also includes other well-known processing circuitry like analog-to-digital converters and digital-to-analog converters for processing an incoming or outgoing signal, respectively.

Modem 200 receives an incoming signal, on lead 201, from telephone network 130. This incoming signal includes two distinct signals from telephone network 130, one is a "ringing signal," and the second is a "modulated information signal" that is representative of CPDN information in accordance with Bellcore Calling Number Delivery Technical Reference TATSY-000031 mentioned above and Bellcore Technical Advisory "Voiceband Data Transmission Interface Generic Requirements," TA-NWT-000030, Issue 3, Apr. 1992. This modulated information signal is typically multiplexed between the ringing signals. Both off-hook relay 260 and relay bypass circuit 250 receive the incoming signal. Initially, off-hook relay 260, under the control of CPU 210 via lead 212, blocks this incoming signal from hybrid circuit 240. In actuality, off-hook relay 260 controls the line impedance that is seen by telephone network 130. This line impedance, as is known in the art, provides an indication to telephone network 130 as to whether or not the called party, in this case modem 200, has answered the telephone call. In other words, initially modem 200 is in the "on-hook" state, that is, modem 200 has not yet answered the telephone call—with the result that telephone network 130 continues to apply the incoming signal on lead 201, Notwithstanding the fact that off-hook relay 260 blocks the incoming signal from hybrid 240, relay bypass circuit 250 provides the incoming signal to hybrid 240 via lead 251. This allows the incoming signal to be processed without answering the telephone call and thereby charging the calling party. Hybrid 240 provides the incoming signal on received signal lead 241 to DSP 230, which decodes the incoming signal and provides information to CPU 210 via DSP status information path 231. This information includes both a ringing signal indication and the calling party's CPDN.

Upon receiving the calling party's CPDN number, CPU 210 compares this number with each of the CPDN numbers on caller pays list 221, which is stored in memory 220. If the calling party's CPDN is found on caller pays list 221, CPU 210 sends information to DSP 230, via control information path 211, to begin the data call establishment process, e.g., to initiate a V.32 call establishment sequence that includes modem handshaking and training. In addition, CPU 210 activates off-hook relay 260, via lead 212. As a result, off-hook relay 260 provides the ringing signal on lead 201 to hybrid 240, and, in the process, changes the line impedance so that telephone network 130 now detects an "off-hook" condition, which represents that modem 200 has answered the telephone call. After answering the telephone call and completing the call establishment sequence with modem 120, modem 200, via data terminal equipment interface 270, provides a data stream on lead 151 to computer 150.

However, if the calling party CPDN is not found on caller pays list 221, then CPU 210 looks for the calling party CPDN on we pay list 222. If the calling party's CPDN is found on we pay list 222, CPU 210 stored the calling party's CPDN number in recent number location 224 and continues to monitor the DSP status information waiting for DSP 230 to indicate that the ringing signal has stopped, i.e., that telephone network 130 has terminated the incoming signal because the calling party has hung-up. When CPU 210 detects that the ringing signal has stopped, CPU 210 enables, via lead 212, off-hook relay 260, which provides an off-book signal to telephone network 130 to indicate that modem 200 is ready to make a telephone call. In addition, CPU 210 sends information to DSP 230, via control path 211, to initiate the telephone call and wait for an answer tone from the called party's modem. The information passed to DSP 230 includes the number stored in recent number location 224, which is converted by DSP 230 into a series of touch-tones, or dial pulses, and applied to transmit lead 232 for transmission, through hybrid 240 and off-hook relay 260, to telephone network 130 via lead 201.

Finally, if CPU 2 1 0 does not find the calling party's CPDN on any of the plurality of lists, CPU 210 simply continues to ignore the ringing status information provided by DSP status information path 231. In other words, modem 200 does not answer, or return, the telephone call.

Figure 3:
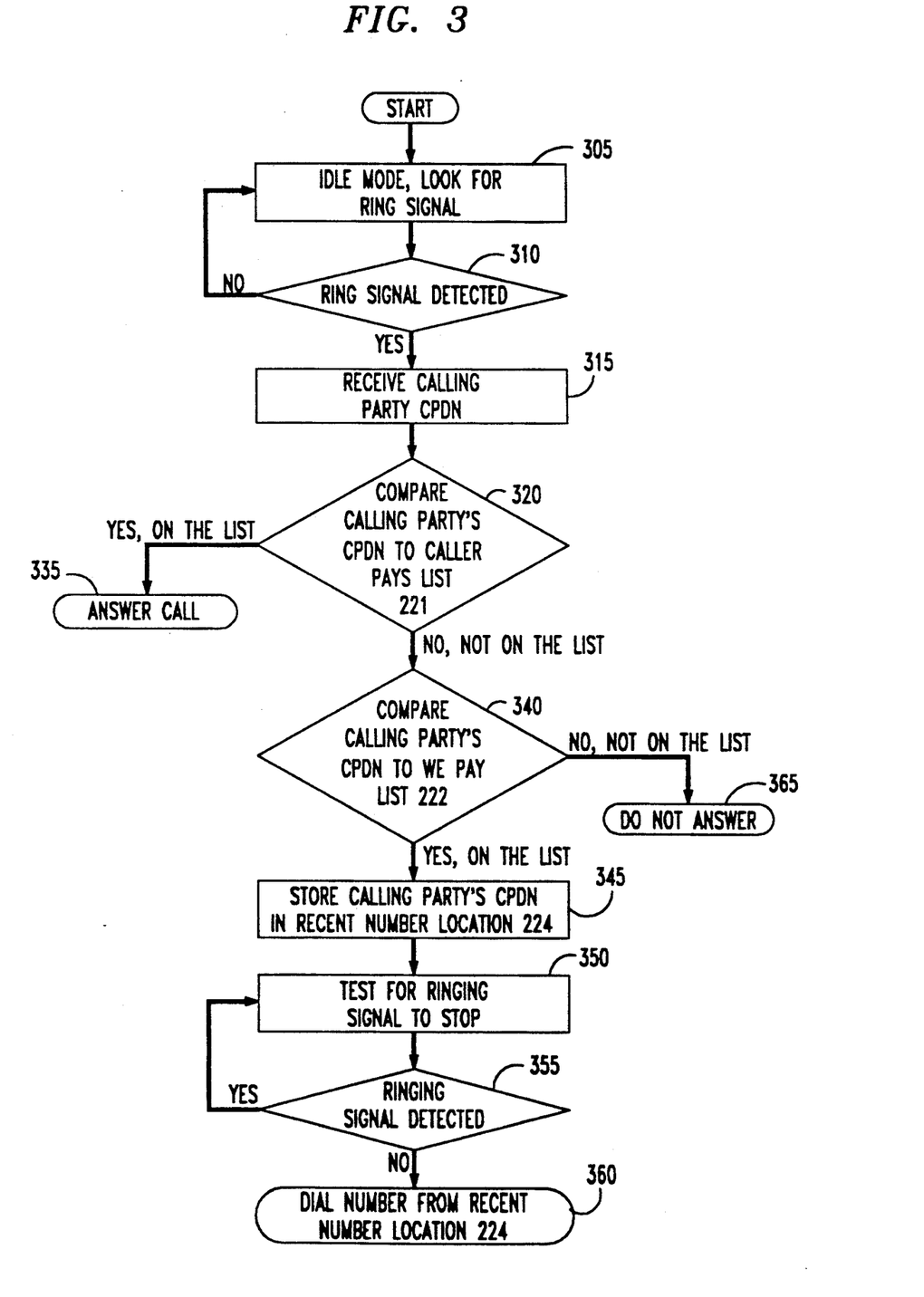
FIG. 3 is a flow diagram of a method used in the modem of FIG. 2.

The flow diagram shown in FIG. 3 depicts a method representing the inventive concept described above. Modem 200 starts in idle mode. In blocks 305 and 310, CPU 210 continually tests the DSP status information for the indication that a ring signal has been received by modem 200. If a ring signal is detected then CPU 210 receives the calling party's CPDN in block 315. At this point, CPU 210 begins to compare the calling party's CPDN with each of the plurality of lists, each list including a plurality of valid CPDN numbers.

First, CPU 210 provides simple password security by comparing the calling party's CPDN to caller pays list 221 in block 320. If the calling party's CPDN is located in this list, modem 200 answers the incoming telephone call, as described above, in block 335.

However, if the calling party's CPDN is not located on caller pays list 221, then CPU 210 compares the calling party's CPDN to we pay list 222 in block 340. If the calling party's CPDN is located on this list, CPU 210 then stores the calling party's CPDN in recent number location 224 in block 345. After this, CPU 210 tests for the ringing signal to stop in blocks 350 and 355. When CPU 210 detects that the ringing signal has stopped, modem 200 then dials the telephone number that was stored in recent number location 224, as described above, in block 360 and thereby provides callback security.

If the calling party's CPDN was not found by CPU 210 on either caller pays list 221 or we pay list 222, modem 200 simply does not answer, or return, the incoming telephone call in block 365.

Figure 4:
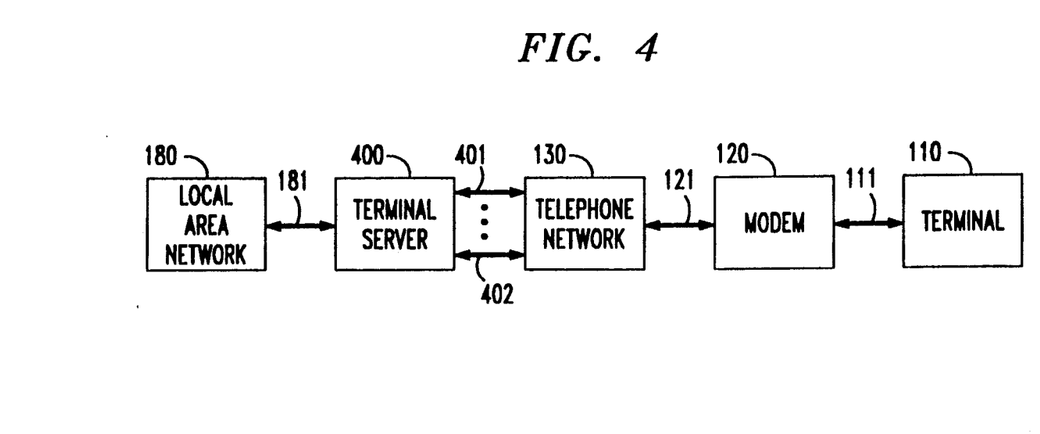
FIG. 4 is a block diagram of a point-to-multipoint data communications system.

Another embodiment of the invention is shown in the point-to-multipoint communications system of FIG. 4, in which the data communications equipment embodying the principles of the invention is terminal server 400. Similar to the description above, terminal server 400 receives a telephone call from a calling party at called terminal 1 10 via modem 120 and telephone network 130. This telephone call is illustratively received on line 401, which is one of a plurality of tip/ring, or local loop lines, that terminate at terminal server 400. Again, it is assumed that telephone network 130 provides calling party CPDN on each one of these local loop lines. Terminal server 400 provides access to local area network (LAN) 180, which, as is known in the art, includes a local area network server or router (not shown).

Figure 5:
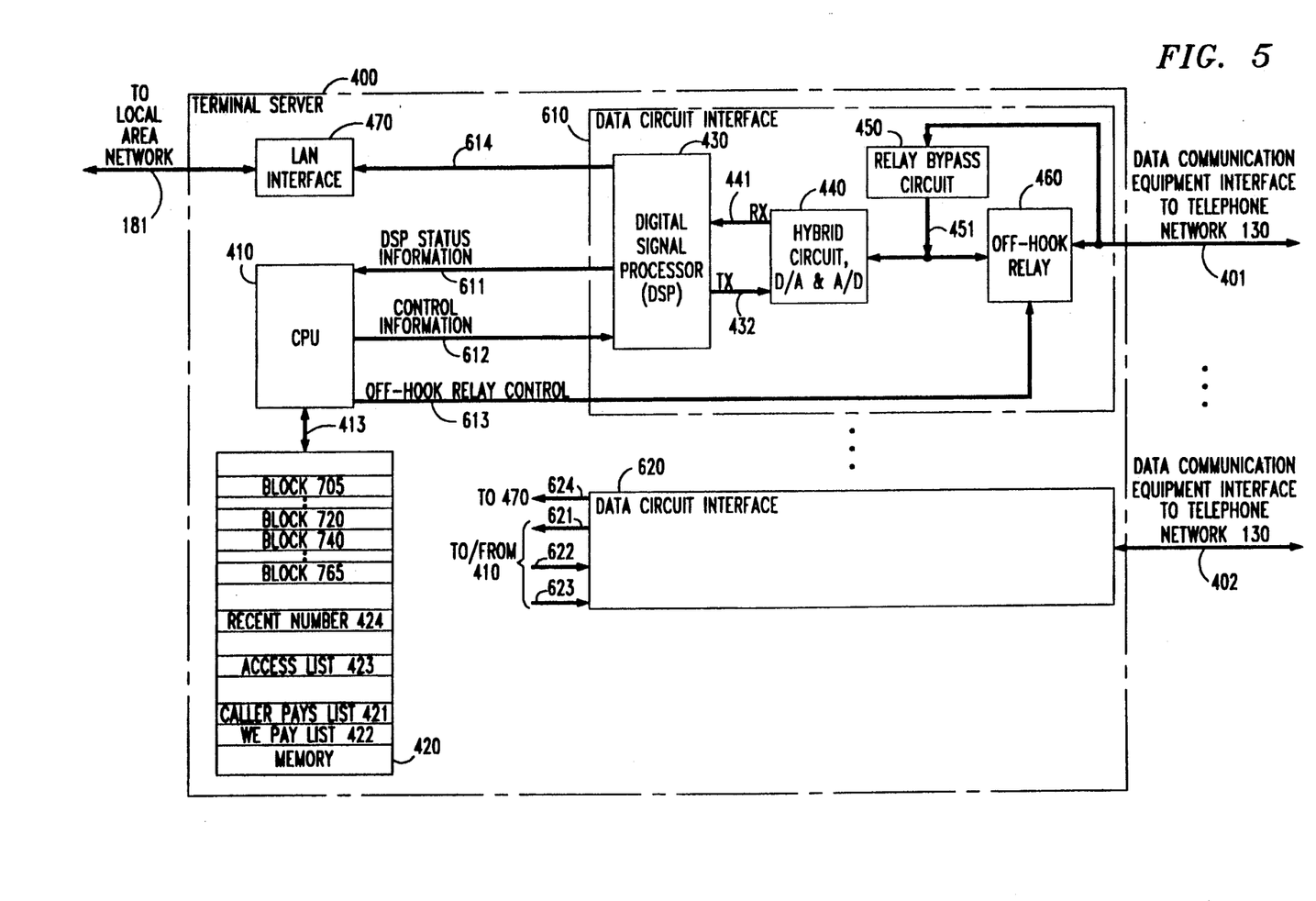
FIG. 5 is a block diagram of a terminal server embodying the principles of the invention that is used in the data communications system of FIG. 4.

Terminal server 400, embodying the principles of the invention, is shown in FIG. 5. Terminal Server 400 comprises memory 420, CPU 410, local area network interface 470 and data circuit interfaces 610 and 620. Since data circuit interfaces 610 and 620 are identical, for simplicity, only data circuit interface 610 is shown in detail and will be described. Data circuit interface 610 includes Digital Signal Processor (DSP) 430, hybrid circuit 440, relay bypass circuit 450, and off-hook relay 460. CPU 410 is a microprocessor central processing unit, which operates on, or executes, program data stored in memory 420, via path 413. Memory 420 is representative of random access memory (RAM), and comprises a number of representative storage locations, of which a subset is shown in FIG. 5. It is assumed that memory 420 includes the plurality of CPDN lists, represented in FIG. 5 by caller pays list 421, we pay list 422 and "access" list 423. In addition, for simplicity, it is assumed that hybrid 440 is not only a 2-to-4 wire convener but also includes other well-known processing circuitry like analog-to-digital converters and digital-to-analog converters for processing an incoming or outgoing signal, respectively.

Terminal server 400, in regards to the inventive concept, operates similarly to modem 200 described above except for the fact that terminal server 400 interfaces to LAN 180 via LAN interface 470. Terminal server 400 receives an incoming telephone call on lead 401, from telephone network 130. As described above, this incoming signal includes two distinct signals from telephone network 130, one is a ringing signal, and the second is a modulated information signal that is representative of CPDN information. Both off-hook relay 460 and relay bypass circuit 450 receive this incoming signal. Initially, off-hook relay 460, under the control of CPU 410 via lead 613, blocks this incoming signal from hybrid circuit 440 and maintains an on-hook state. Relay bypass circuit 450 provides the incoming signal to hybrid 440 via lead 45 1. This allows the incoming signal to be processed without answering the telephone call and thereby charging the calling party. Hybrid 440 provides the incoming signal on received signal lead 441 to DSP 430, which decodes the incoming signal and provides information to CPU 410 via DSP status information path 611. This information includes both a ringing signal indication and the calling party's CPDN.

As described above, there are three possibilities for processing the incoming telephone call from called terminal 110, each of which depend on whether or not the calling party's CPDN is on caller pays list 421 or we pay list 422. However, in addition, if the calling party's CPDN is on either caller pays list 421 or we pay list 422, CPU 410 then compares the calling party's CPDN number to of access list 423. This access list is an association to each CPDN on either caller pays list 421 or we pay list 422 of a level of security for accessing local area network 180. In other words, terminal server 400 provides a "logical" connection between a calling party and the respective level of security on local area network 180 instead of a "physical" connection, as in the prior art. The latter being dependent only on which physical data circuit interface received the telephone call. This logical association between a calling party's CPDN and a level of security is illustratively provided by common computer programming techniques. For example, for each CPDN on caller pays list 421 there is an associated "pointer" to a location in access list 423, which stores information related to the level of security for accessing local area network 180. Alteratively, the calling party's CPDN can be used as an argument to a "hashing function," which determines the location of the access information in access list 423. The actual information located in access list 423 is a number that is representative of a "logical address" for use on LAN 180. As is known in the art, this logical address is used by local area network server of LAN 180 for providing a level of security, or controlling the amount of access, to any applications that are available on LAN 180.

Figure 6:
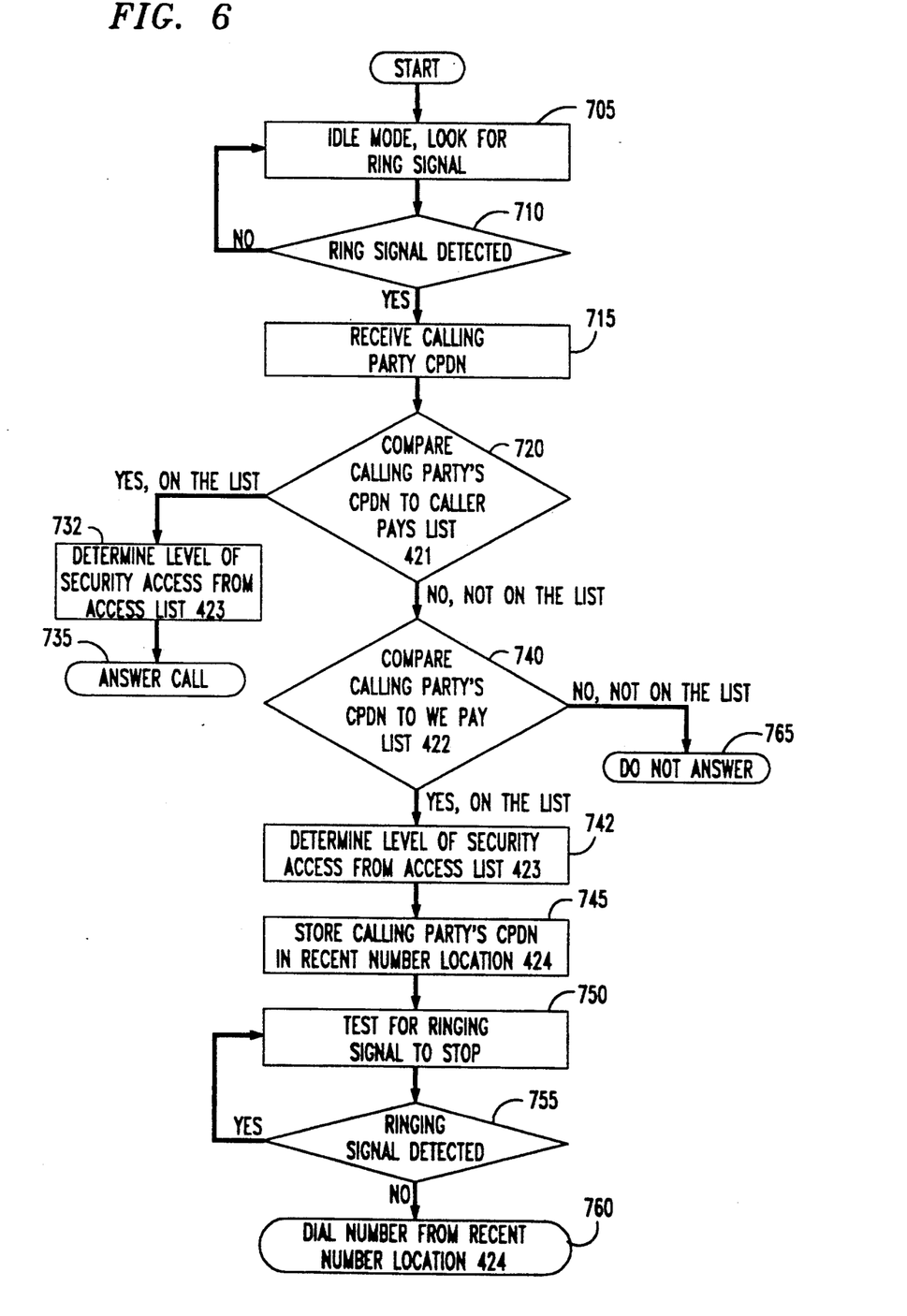
FIG. 6 is a flow diagram of a method used in the terminal server of FIG. 5.

The flow diagram shown in FIG. 6 depicts a method representing the inventive concept described above for terminal server 400. This flow diagram is similar to the flow diagram shown in FIG. 3 for modem 200 that was described above. A functional difference is the inclusion of blocks 732 and 742, which are reached by CPU 410 if a calling party's CPDN is on either caller pays list 421 or we pay list 422. In either block 732 or block 742, CPU 410 determines the level of security as provided by access list 423 and the calling party's CPDN.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, other information, besides CPDN, may also be provided from the telephone network, like time of day and a name associated with the calling party. This information can also be used to provide additional levels of security, like allowing a calling party access to a computer only during specific times of the day.

We claim:

1. Data Communication equipment apparatus for use in establishing a data connection between a calling party's data terminal equipment and a called party's data terminal equipment, comprising:

means for receiving a caller identification number of the calling party;

storage means for providing a list of caller identification numbers; and means for a) accessing the storage means to compare the received caller identification number to the list and for b) initiating a modem handshaking and training sequence to a data communication equipment of the calling party to establish the data connection between the data terminal equipment of the called party and the calling party's data terminal equipment if the received caller identification number of the calling party is on the list of called identification numbers.

2. The apparatus of claim 1 wherein the means for accessing and initiating answers a telephone call from the calling party before initiating the modem handshaking and training sequence.

3. The apparatus of claim 1 wherein the means for accessing and initiating calls back the calling party before initiating the modem handshaking and training sequence.

4. The apparatus of claim 1 wherein the signal includes a ringing signal and a modulated signal that includes the caller identification number.

5. The apparatus of claim 1 wherein the means for accessing and initiating provides a level of security for accessing the called party's data terminal equipment that is dependent upon the calling party's caller identification.

6. The apparatus of claim 1 wherein the data communication equipment is a modem.

7. The apparatus of claim 1 wherein the data communications equipment is a terminal server and the called party's data terminal equipment is a local area network.

8. Modem for use in a telephone call between a calling party and a called party, comprising:

means for receiving and processing an incoming signal, which represents the telephone call, from a public switched telephone network to provide 1) status information which is representative of a ringing signal included within the incoming signal, and 2) a caller identification number of the calling party, which is included within the incoming signal;

storage means for providing a list of caller identification numbers;

data terminal interface means for coupling to a data terminal of the called party; and CPU means responsive to the status information indicating that a ringing signal has been received that compares the caller identification number of the calling party to each of the caller identification numbers on the list, and that initiates a modem handshaking and training sequence through the means for receiving and processing to a modem of the calling party to establish a data connection to the coupled data terminal, if the caller identification number of the calling party is on said list.

9. The apparatus of claim 8 wherein the CPU means further controls the means for receiving and processing to answer the telephone call before initiating the modem handshaking and training sequence.

10. The apparatus of claim 8 wherein the CPU means further controls the means for receiving and processing to call back the calling party before initiating the modem handshaking and training sequence.

11. A method for use in a called party's data communications equipment for processing a telephone call from a calling party's data terminal equipment to the called party's data terminal equipment, the method comprising the steps of:

receiving in a modem a caller identification number of the calling party;

comparing in the modem the caller identification number of the calling party to a list of caller identification numbers; and performing a modem handshaking and training sequence in order to establish a data connection between the called party's data terminal equipment and the calling party's data terminal equipment if the caller identification number of the calling party is on the list of caller identification numbers.

12. The method of claim 11 wherein the performing step answers the telephone call from the calling party before performing the modem handshaking and training sequence.

13. The method of claim 11 wherein the performing step calls back the calling party before performing the modem handshaking and training sequence.

14. The method of claim 11 wherein the called party's data terminal equipment is a local area network.

15. The method of claim 11 wherein the called party's data terminal equipment is a computer.

16. The method of claim 11 wherein the performing step includes the step of providing a level of security for accessing the called party's data terminal equipment that is dependent upon the caller identification number of the calling party.

* * * * *